United States Patent [19]

Elliott et al.

[11] Patent Number: 4,544,379
[45] Date of Patent: Oct. 1, 1985

[54] METHOD FOR METAL HALIDE REMOVAL

[75] Inventors: Henry H. Elliott; Lawrence R. Lepovitz; Dale G. Jones, all of Visalia, Calif.

[73] Assignee: Emcotek, Visalia, Calif.

[21] Appl. No.: 630,920

[22] Filed: Jul. 16, 1984

Related U.S. Application Data

[63] Continuation-in-part of Ser. No. 760,362, filed as PCT US 83/00394, Mar. 13, 1983, published as WO 84/03641, on Sep. 27, 1984, § 102(e) date Jun. 28, 1985.

[51] Int. Cl.$^4$ ............................................. B01D 47/08
[52] U.S. Cl. .......................................... 55/71; 55/72; 55/91; 55/94
[58] Field of Search ................ 55/71, 72, 91, 94, 223, 55/230; 261/88, 90

[56] References Cited

U.S. PATENT DOCUMENTS

| | | | |
|---|---|---|---|
| 2,953,218 | 9/1960 | Coates | 55/72 X |
| 3,336,731 | 8/1967 | Phillips et al. | 55/71 |
| 3,690,041 | 9/1972 | Low | 55/71 |
| 3,789,109 | 1/1974 | Lyon et al. | 55/71 X |
| 3,861,891 | 1/1975 | Noguchi et al. | 55/230 |
| 3,885,929 | 5/1975 | Lyon et al. | 55/87 |
| 3,919,391 | 11/1975 | Scholes et al. | 423/240 |
| 3,956,532 | 5/1976 | Russell | 55/71 X |
| 3,967,939 | 7/1976 | Scholes et al. | 55/108 |
| 4,000,993 | 1/1977 | Holl | 55/94 |
| 4,029,484 | 6/1977 | Fitzpatrick | 55/71 |
| 4,066,424 | 1/1978 | Kilgren et al. | 55/71 |
| 4,194,888 | 3/1980 | Schwab et al. | 55/2 |
| 4,242,109 | 12/1980 | Edwards | 55/230 |
| 4,289,506 | 9/1981 | Stone | 55/230 X |

OTHER PUBLICATIONS

Khlopkov, Derwent Abstract No. 81-65640D/36 of Soviet Union Publication No. 789,139 published 12-80.

*Primary Examiner*—Kathleen J. Prunner
*Attorney, Agent, or Firm*—Townsend & Townsend

[57] ABSTRACT

A method for removing metal halides from effluent gas streams employs a rotary spray scrubber including an elongate gas flow duct and a rotary scrubber dispersion hub. The rotary spray scrubber is characterized by a ratio of hub diameter to duct diameter in the range from about 0.55 to 0.75. Using a basic liquid scrubbing medium in such a scrubber, metal halide particulate and hydrochloric acid gas removal efficiencies in excess of 99% have been achieved.

7 Claims, 10 Drawing Figures

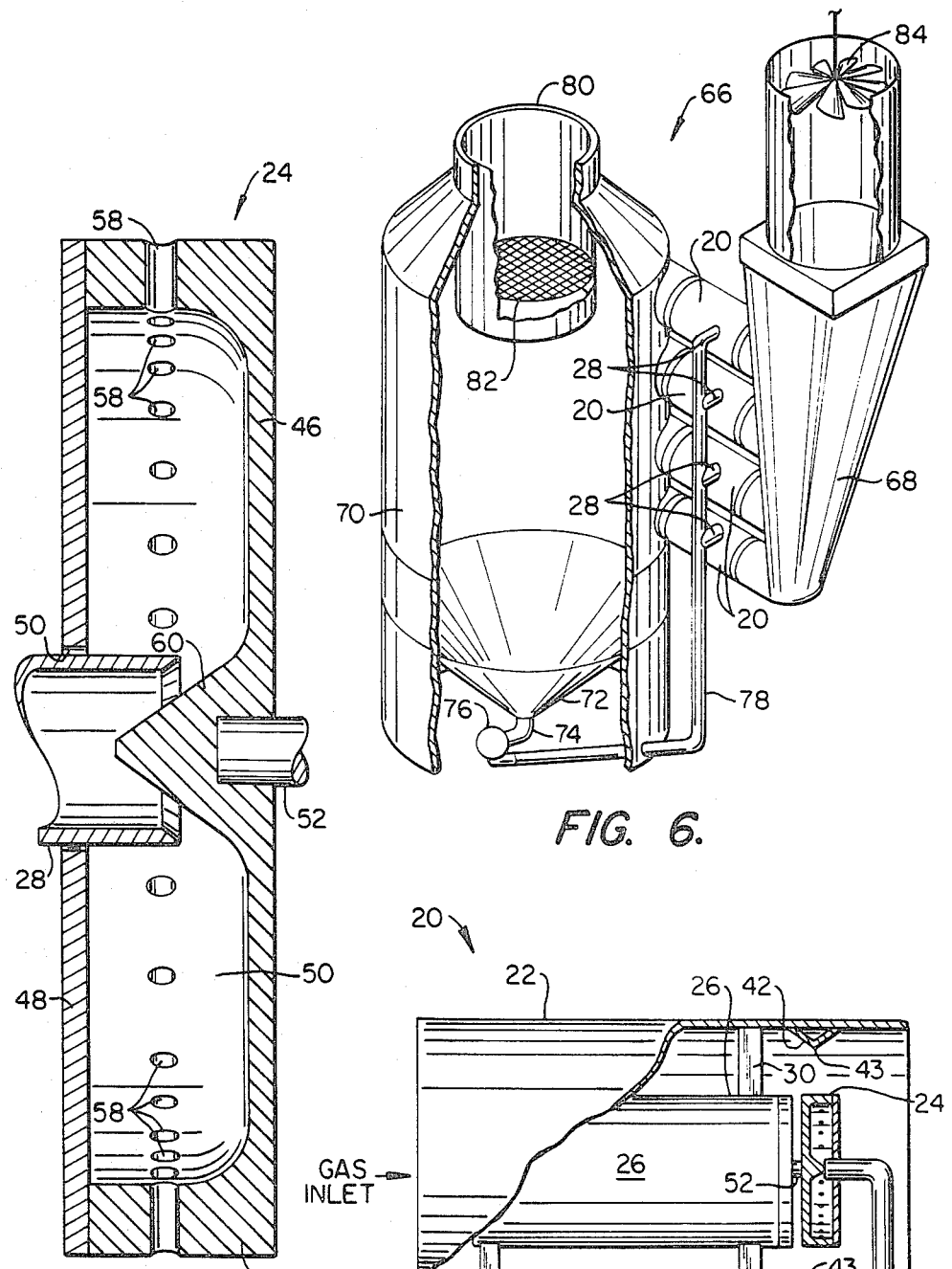

METHOD FOR METAL HALIDE REMOVAL

This application is a continuation-in-part of Patent Cooperation Treaty application Ser. No. 760,362, filed as PCT US 83/00394, Mar. 13, 1983, published as WO 84/03641, on Sep. 27, 1984, § 102(e) date Jun. 28, 1985, designating the United States.

BACKGROUND OF THE INVENTION

1. Field of the Invention

The present invention relates generally to the removal of vapors and particulates from a flowing gas stream, and more particularly to the removal of metal halides from waste streams, such as those resulting from the treatment of glass with a volatile metal halide such as anhydrous stannic chloride, titanium tetrachloride, or silicon tetrachloride.

To prevent damage during high speed filling operations, glass containers such as jars, bottles, and the like, are coated with various films which strengthen the glass during filling, subsequent handling, and ultimate use by the consumer. A particularly effective coating can be formed by spraying metal halides such as anhydrous stannic chloride ($SnCl_4$) or anhydrous titanium tetrachloride ($TiCl_4$) onto the glassware at a high temperature, which treatment results in the formation of a layer of the corresponding metal oxide on the surface of the glass. Such coatings have been found to substantially enhance the strength of the treated glass.

The anhydrous metal halides are typically sprayed onto the bottles which are at a very high temperature, typically in the range from 800° F. to 1100° F. On contact, the metal halides are converted to the corresponding metal oxide, resulting in the formation of HCl. A large proportion of the metal halide spray, however, does not adhere to the bottle, and both the HCl and the excess metal halide are carried away from the process, typically by a hood or other venting system. The exhaust stream from the venting system is unsuitable for release into the ambient air and must be treated to remove both the metal halides and HCl gas.

For these reasons, it would be desirable to provide a method and apparatus for treating gas streams containing metal halides, particularly gas streams containing both metal halides and HCl gas. Such a method and process should provide for a very high level of removal, preferably above 99%, and should be relatively inexpensive to build and operate.

2. Description of the Prior Art

A rotary spray scrubber of the type of the present invention is described in U.S. Pat. No. 4,242,109 to Edwards. The scrubber includes a conduit for directing the particulate-laden gas stream in a first direction. An axial impeller induces flow of the gas through the conduit. A rotary dispersion device attached on a common shaft with the impeller and located immediately downstream thereof directs a spray of droplets into the flowing air stream. The nature of the rotary dispersion device is not discussed in detail in the patent.

Certain machines incorporating the teachings of the Edwards patent have been manufactured and sold by EMCOTEK Emission Control Technology, Visalia, Calif. 93291. The dispersion device employed in these machines is illustrated in FIG. 1 and comprised a six-inch diameter hub 10 including a pair of spaced-apart disks 12 joined by a perforated sheet metal periphery 14. Perforations 16 comprised about 50% of the peripheral surface area. Water was fed into the hub 10 through an opening 18 in one of the disks and the hub rotated to generate a spray. The hubs were placed in conduits (reference no. 15 in the Edwards patent) having a diameter of 18 inches. Using this device, collection efficiencies of submicron particles above 50% could not be achieved.

Various aqueous scrubbing systems have been proposed for the removal of metal halides from gas streams. U.S. Pat. No. 3,690,041 teaches the use of an aqueous pre-spray to eliminate misting normally encountered in the conventional water scrubbing of gas streams containing both HCl gas and stannic chloride. U.S. Pat. Nos. 3,789,109 and 3,885,929 both teach the high temperature conversion of metal halides to metal oxides prior to conventional scrubbing. See also, Russian Pat. No. 789,139 which concerns the construction of a particular scrubber for the removal of titanium tetrachloride from gas streams. Diffusiophoretic and electrostatic methods for the removal of metal halides from a gas stream are taught by U.S. Pat. Nos. 3,956,532 and 3,967,939. Prior art approaches for the removal of metal halides from glass treatment effluents are described generally in "How to Remove Pollutants and Toxic Materials From Air and Water," Pollution Technology Review, No. 32, Noyes Data Corporation, 1977, pages 208-214.

SUMMARY OF THE INVENTION

The present invention provides an improved method for metal halide removal from gas streams, such as effluent streams from glass treatment plants. The present invention employs a particular rotary spray scrubber, and using this scrubber collection efficiencies in excess of 99% have been achieved without resorting to high temperature oxidation to the metal oxide requiring expensive natural gas burners, or the use of cumbersome electrostatic devices or additives as taught by U.S. Pat. No. 3,956,532.

The rotary spray scrubber of the present invention includes a cylindrical duct which receives the effluent stream containing the metal halides and a rotary dispersion device for directing a generally radial spray of liquid scrubbing medium into the effluent stream. The liquid scrubbing medium, which is typically dilute NaOH, appears to react with the anhydrous metal halides to form a precipitate of metal hydrates and oxides and hydrochloric acid. These are collected by impact on and absorption with the water spray. It is critical that a vigorous water spray be maintained in the annular space between the rotary spray hub and the cylindrical duct. Such a spray is maintained by providing a rotary hub diameter in the range from about 0.55 to 0.75 of the duct diameter, with a maximum practical duct diameter of about 48 inches.

A preferred rotary dispersion hub includes a relatively thick annular lip having a number of radial passages, usually in the range from about 8 to 64, more usually in the range from 16 to 32. Altogether, the cross-sectional area of the passages will be limited to below about 10% of the peripheral surface area of the hub, usually being in the range between about 1% and 5%. In the most preferred embodiment, the dispersion hub has a diameter in the range from about 10 to 12 inches, while the peripheral wall diameter will be from about 18 to 24 inches. Liquid scrubbing medium directed through the passages is fully accelerated by the rotation of the hub and very small droplets on the order of 10 to 50 microns are generated, with the exact size depending on the diameter and rotational speed of the hub (i.e., the tangential velocity). Due to the high velocity and large number of these droplets, high particulate collection efficiency can be achieved with much less water than required by prior art scrubbers. Moreover, such generation of the droplets requires much less energy than the corresponding generation by pumping through a nozzle.

BRIEF DESCRIPTION OF THE DRAWINGS

FIG. 4 is a view, similar to FIG. 3, of an alternate embodiment of the gas cleaning module of the present invention.

FIG. 5 is a side elevational view of the preferred rotary dispersion hub of the present invention shown in section.

FIG. 6 illustrates a gas cleaning system employing a plurality of the gas cleaning modules of the present invention.

DESCRIPTION OF THE PREFERRED EMBODIMENTS

The present invention provides a particularly efficient method for removing metal halide vapors, particularly stannic chloride ($SnCl_4$) and titaniumtetrachloride ($TiCl_4$) from effluent gases such as those generated in glass treatment plants. The method employs a system described in detail in co-pending application Ser. No. PCT/US83/00394, filed on Mar. 18, 1983, the relevant portions of which are incorporated herein by reference.

To understand the present invention, it is helpful to understand the chemistry of the metal halide spray systems which are employed in the gas bottling industry. Anhydrous metal halides are liquids at ambient temperature and are sprayed onto glass bottles in their liquid form. On contact with the surface of the glass bottles, which have been heated to a temperature in the range from about 800° F. to 1100° F., the metal halides are oxidized to their corresponding metal oxides, generating HCl gas. A substantial portion of the metal halide spray, however, does not contact the bottle and instead passes out in the exhaust system which is provided in the metal halide spray area. Such exhaust stream, thus, includes large amounts of entrained anhydrous metal halide vapor and HCl gas.

Depending on the ambient moisture present, a portion of the anhydrous metal halide will become hydrated, and such hydrated metal halides are solids at the temperature of interest. For stannic chloride, the hydration reaction is as follows:

$$SnCl_{4(g)} + 5H_2O_{(g)} \rightarrow SnCl_4 \cdot 5H_2O_{(s)}$$

The hydrated stannic chloride is able to further react with a caustic solution, such as NaOH, to form a second solid (stannic hydroxide) by the following reaction:

$$SnCl_4 \cdot 5H_2O_{(l)} + 4NaOH_{(l)} \rightarrow Sn(OH)_{4(s)} + 4NaCl_{(l)} + 5H_2O$$

It is believed that the stannic hydroxide particles form generally larger aggregates than the hydrated stannic chloride particles, and thus the formation of the stannic hydroxide particles facilitates subsequent separation from the scrubbing solution.

Figure 1:
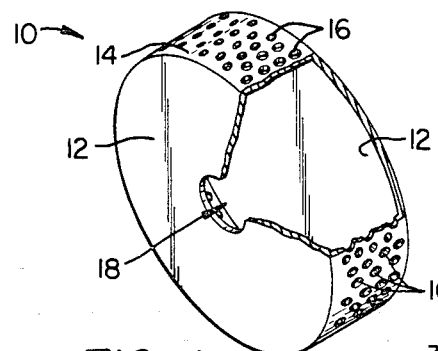
FIG. 1 is an isometric view of the prior art rotary dispersion hub with portions broken away.
Figure 2:
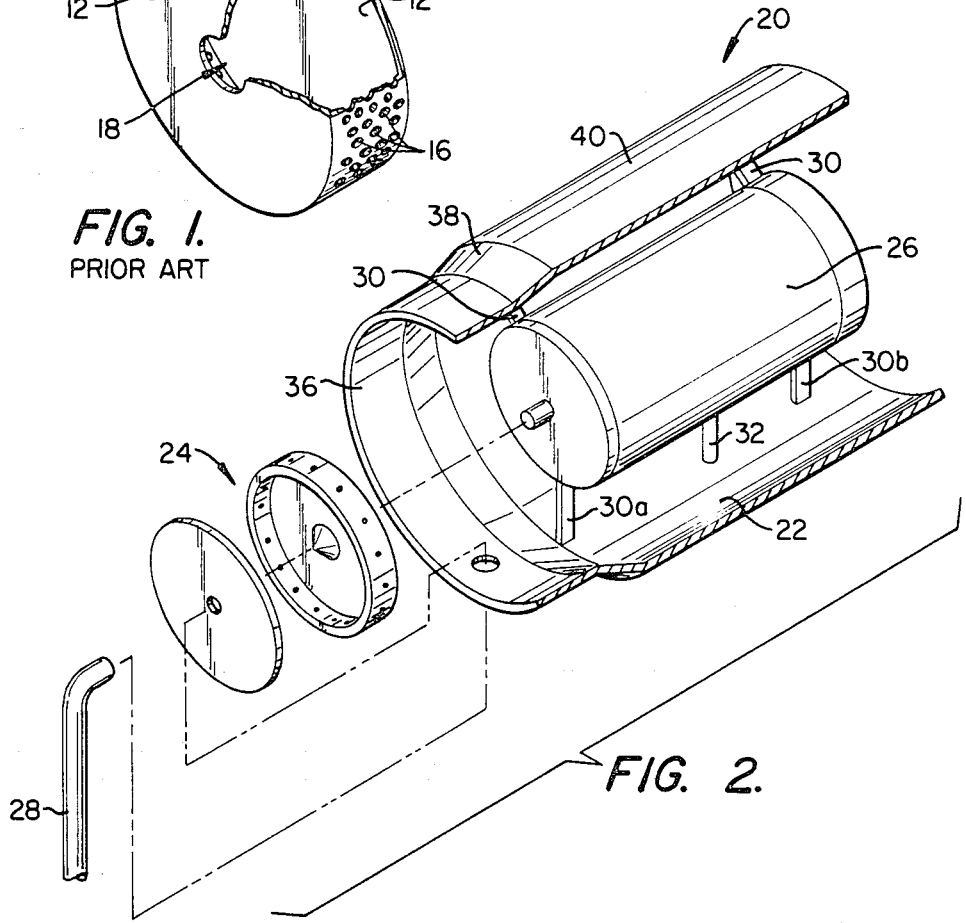
FIG. 2 is an exploded isometric view of the gas cleaning module of the present invention with portions broken away.
Figure 3:
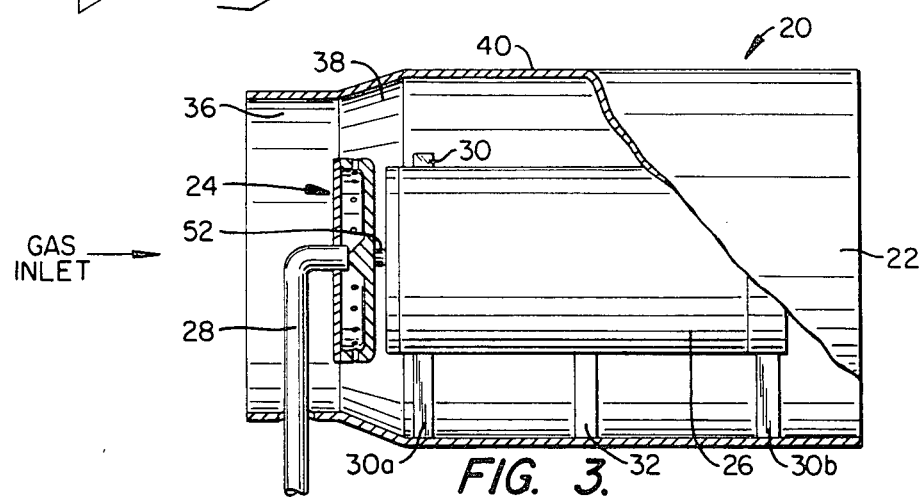
FIG. 3 is a side elevational view of the gas cleaning module of the present invention with portions broken away.

Referring now to FIGS. 2 and 3, a gas cleaning module 20 useful for the removal of metal halides comprises a generally cylindrical duct 22, a rotary dispersion hub 24, a hub drive motor 26, and a water feed line 28. The motor 26 is mounted on a plurality of struts 30. A pair of the struts 30a and 30b are hollow and used to provide cooling water or cooling air to and from the motor 26. A conduit 32 is further provided for the power (usually electrical) connection for the motor.

The cylindrical duct 22 comprises three sections. The inlet to the duct is a short cylinder 36. The next section is a collar 38 flared outward in the direction away from the inlet cylinder 36, and the remaining portion is a cylinder 40 having a somewhat greater diameter than the inlet cylinder 36. The precise dimensions of the duct 22 are not critical and, for the purposes of the present invention, it is necessary only that the duct diameter bear the proper ratio to the diameter of the rotary dispersion hub 24, as will be discussed in more detail hereinafter.

Referring now to FIG. 4, a second embodiment of the gas cleaning module 20 comprises a cylindrical duct 22 (having a uniform diameter) with the gas inlet side facing the closed end of hub drive motor 26. The gas travels across support struts 30 through the annular space between the motor 26 and the duct 22. A wedge-shaped flow deflector 42 is fixed to the inside wall of cylindrical duct 22, being generally axially aligned with the hub 24. The deflected airflow is scrubbed by high velocity droplets which exit from the rotary dispersing hub 24 in a radial direction. Scrubbing liquid is supplied to the rotary hub 24 by feed line 28. The approximate dimensions of flow deflector 42 are such that the minimum diameter at the apex 43 of the wedge is not less than 90% of the cylindrical duct 22 diameter, usually being from 95 to 90%.

The purpose of the deflector 42 is to deflect the incoming gas stream toward the radial spray. As the spray approaches the interior wall of the duct 22, the spray velocity acquires an increasingly large axial component which diminishes its impaction efficiency. By deflecting the gas at the outer periphery toward the center line of the duct 22, the spray impacts the particulates at closer to a perpendicular approach angle and the collection efficiency is improved.

Referring now to FIG. 5, the rotary dispersion hub 24 will be described in detail. The hub 24 comprises a rim member 46 and a cover plate 48 which together define a water-receiving cavity 50. The cover plate 48 has a central opening 50 which receives the distal (open) end of water feed line 28. The rim member 46 is mounted on a shaft 52 driven by the motor 26. The shaft 52 and the portion of water feed line 28 which projects through opening 50 in cover plate 48 are axially aligned so that the feed line 28 does not interfere with rotation of the hub 24.

The rim member 46 includes an annular flange 56 about its periphery, said flange including a plurality of radial passages 58 therethrough. The number of passages 58 may vary widely depending on the diameter and thickness of the hub and on the collection efficiency desired. Arrangement of the passages 58 into a single row including thirty-two holes, which are equally spaced apart about the circumference of the flange 56, has been found suitable for most applications. While the addition of more passages 58, or more rows of passages, may improve the collection efficiency under certain circumstances, the increased water consumption is undesirable. The hub of the present invention usually operates well with a relatively low number of passages, typically from eight to 64, more typically from 16 to 32.

The rim member 46 includes a deflecting cone 60 aligned along its central axis and projecting into the interior cavity 50. In this way, as the water flows in through water feed line 28, it is deflected evenly throughout the entire cavity so that water flow is even in all directions. The system functions when the dispersing hub 24 is oriented vertically, horizontally, or at any inclination in between.

The hub parameters of importance include the hub 24 diameter, the thickness of the annular flange 56, the total number of holes, and the arrangement of holes into discrete rows. The hub diameter must be selected together with the duct diameter to provide sufficient clearance between the hub and the duct to allow the expected flow rate of particulate-laden air. Generally, as the hub diameter increases, the duct diameter will also increase within the specified ratio (i.e., 0.55 to 0.75). This results in an increased annular clearance and larger hub diameters are chosen for higher expected flow rates. The thickness of the annular flange 56 is less critical. It is necessary only that the thickness be sufficient so that the water ejected from each passage 58 is fully accelerated to the tangential velocity of the periphery of the hub 24. This assures that the water will be fully atomized in very small droplets. An annular flange thickness of at least about one inch is usually sufficient, although greater thickness up to several inches are also useful. The diameter of the individual passages 58 is also not critical. Diameters of from 1/16 to 5/16 of an inch are adequate.

Selection of the optimum diameter ratio between the hub and the outer tube depends on the physical dimensions of the outer tube. The optimum diameter ratio should provide maximum water droplet velocity (VH) relative to the crossflowing air velocity (VT) for a given air flowrate (CFM) and hub rotational speed (RPM). Theoretically, this velocity ratio can be expressed:

$$\left(\frac{VH}{VT}\right) = \left(\frac{\text{RPM}}{CFM}\right)\left(\frac{HT^2}{700.3}\right)\left[1 - \left(\frac{H}{T}\right)^2\right]$$

where H is the hub diameter, T is the outer tube diameter, (both in inches) and (H/T) is the critical diameter ratio. If the RPM, CFM and T are constants, then the derivative of the velocity ratio with respect to H is:

$$\frac{d}{dH}\left(\frac{VH}{VT}\right) = 1 - 3\left(\frac{H}{T}\right)^2$$

Setting the derivative equal to zero, the optimum diameter ratio from a theoretical standpoint is:

$$\left(\frac{H}{T}\right) = \left(\frac{1}{3}\right)^{0.5} = 0.574$$

As determined experimentally, the optimum diameter ratio for high efficiency removal of submicron particles varies from 0.55 to 0.75 as the size of the outer tube is increased from about 10 inches to about 48 inches. At the larger tube diameters, it is more important to maintain a relatively narrow scrubbing zone by increasing the diameter ratio than it is to maintain the optimum velocity ratio.

The module 20 of the preferred embodiment (FIG. 4) includes a duct 22 having an inside diameter of 20 inches, a wedge 42 having a diameter at the apex 43 of 18 inches, and a rotary dispersing hub 24 having a diameter of 11 inches. The length of the duct 22 is not critical with an upstream length of about 18 inches and a downstream length of 8 inches being adequate. Such a module is capable of treating from about 2000 to 4000 SCFM, depending on the metal halide loading and the degree of removal desired.

While the dimensions of the module 20 and its components can vary widely, there are practical limits to the size. Modules having a duct in diameter below about 10 inches are incapable of handling the large air flows encountered in most applications. On the other hand, duct diameters on the order of 48 inches require very large hubs on the order 36 inches. While such hubs may be constructed, the power required to achieve efficient particulate removal is excessive. For handling larger air flows, it is desirable to use multiple units of an intermediate size.

An exemplary unit 66 including four modules 20 is illustrated in FIG. 6. The units share a common distribution manifold 68 and are arranged horizontally to feed into a vertical cyclonic mist eliminating chamber 70. The chamber 70 includes a cone shaped bottom 72 for collecting the water and entrained particulates as they fall downward. A transfer line 74 from the collection cone 72 feeds a recirculation pump 76. Typically, a portion of the recycled liquid will be withdrawn and disposed of to maintain an acceptable level of particulates in the recycled liquid stream. The recycled liquid is directed through a manifold line 78 to the individual water feed lines 28 associated with each of the gas cleaning modules 20. A clean gas outlet 80 is located at the top of the cyclone chamber and a mist eliminator 82 is provided. Optionally, a fan 84 may be provided at either the dirty gas inlet (as illustrated) or the clean gas outlet of the air cleaner to induce the necessary air flow. Conveniently, an axial fan is used, although any type of blower would be adequate.

In operating the gas cleaning modules 20 a number of parameters must be chosen. Even after the dimensions of the unit 20 are selected, the gas flow rate, liquid flow rate and hub RPM must be selected to provide the desired collection efficiency. In general, both higher hub RPM and higher liquid flow rates lead to improved collection efficiency. They, however, both lead to increased energy consumption so it will usually be necessary to optimize both the hub speed and liquid flow rate to provide just the degree of removal desired.

Generally, gas flows in the range from 2 to 65 MCFM can be accommodated, with smaller diameter units finding use at the lower end and larger diameter units at the upper end. The ratio of scrubbing liquid to gas flow will usually be maintained at or above about 2 gpm/MCFM, more usually at or above about 5 gpm/MCFM with an upper limit of about 25 gpm/MCFM, more usually about 10 gpm/MCFM. Increasing the liquid flow above the upper limit results in higher operating costs with only marginal improvement in removal. The hub rotational speed will depend largely on the hub diameter, with the particular RPM chosen to provide a minimum tangential velocity at the hub periphery of 250 ft/sec, more usually 500 ft/sec.

When operating the glass cleaning module 20 to remove metal halides, it is preferred to utilize a basic liquid scrubbing medium, such as sodium carbonate or hydroxide at a pH greater than 10, preferably at a pH greater than 11. As stated above, the caustic promotes the formation of metal hydroxides from the hydrated metal halides and neutralizes and absorbs the hydrochloric acid (HCl) gas formed. In some cases, it will be desirable to pretreat the flowing gas stream with a caustic spray in order to allow complete moisture saturation and particulate formation prior to passage through the rotary dispersion hub. Such pretreatment is not necessary, however, and the reaction of the hydrated metal halides with the sodium hydroxide in the scrubbing medium itself will usually be sufficient.

The following experiments are offered by way of example and not by way of illustration.

EXPERIMENTAL

Test System Description

Figure 7:
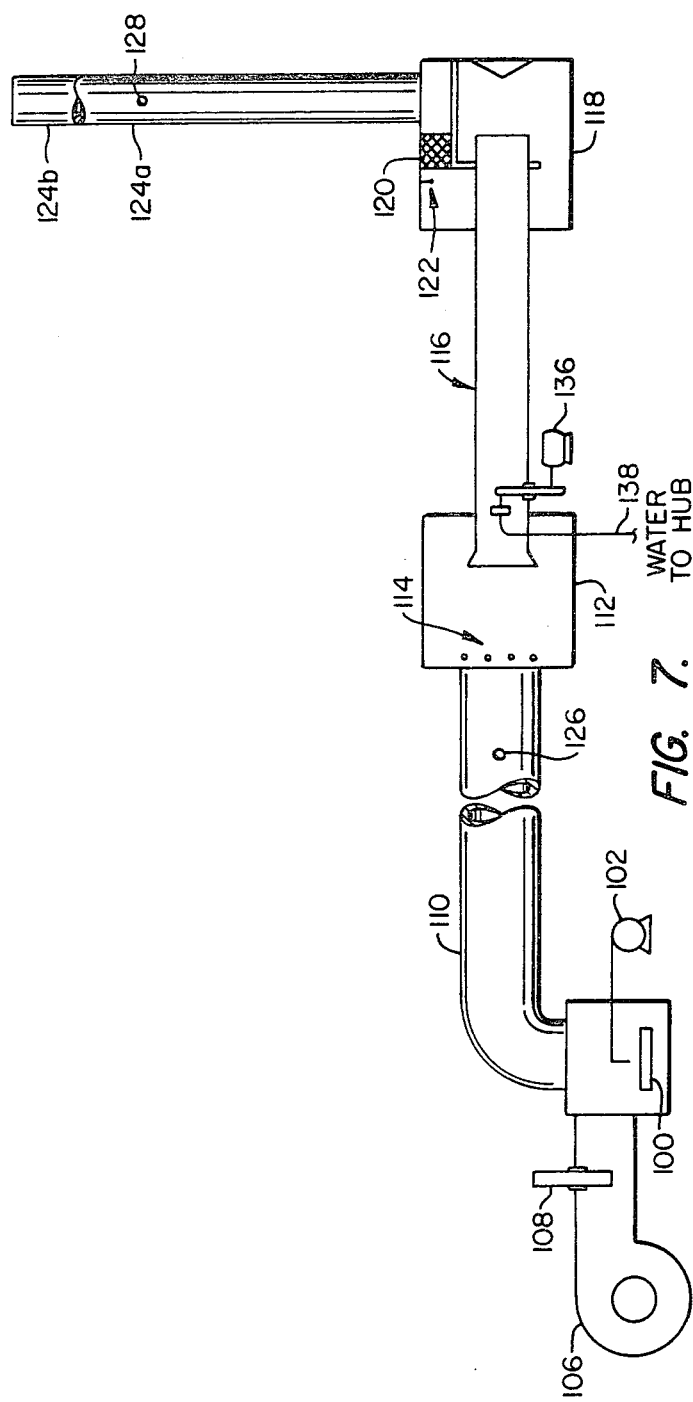
FIG. 7 illustrates the system used in the Experimental section hereinafter.

The test system used in the following experiments is illustrated in FIG. 7. Metal halide particulates were generated by dripping liquid metal halide onto an Arrow Hart hot plate 100 heated to approximately 900° F. The flow rate of the liquid metal halide was regulated by a Cole-Parmer Masterflex variable speed pump 102. By varying the flow rate of liquid metal halide onto the hot plate 100 and regulating the air flow rate, the particulate concentration in the air stream could be controlled.

Air flow through the system was provided by a 10 HP, 28 inch centrifugal fan 106 which delivered a maximum flow of 10,000 CFM at 3 inches of water static pressure. Air flow was regulated by a sliding gate 108 immediately downstream of the fan 106. The metal halide particulates travelled 20 feet in a 24 inch round duct 110 before entering a plenum chamber 112. Nozzles 114 were provided at the inlet to the chamber 114. A caustic spray (0.01 M NaOH) was provided through nozzles 114 to saturate the particulate laden air and reduce the temperature to adiabatic saturation. The air stream then entered a spray scrubbing unit 116. The cleaned air stream then entered a baffled chamber 118 which housed a Heilex-EB four pass mist eliminator 120. Spray nozzles 122 before the mist eliminator 120 prevented reentrainment of particles in the exhaust stream prior to emission out of twin stacks 124a and 124b. The exhaust stacks 124 were 24 inches in diameter and 20 feet tall. Sample ports 126 and 128 were provided four feet upstream of the plenum chamber 112 and the first exhaust stack 124a outlet, respectively. The second exhaust stack 124b housed an opacity meter (not shown) at the same height as sample port 128 on the first exhaust stack.

Figure 8:
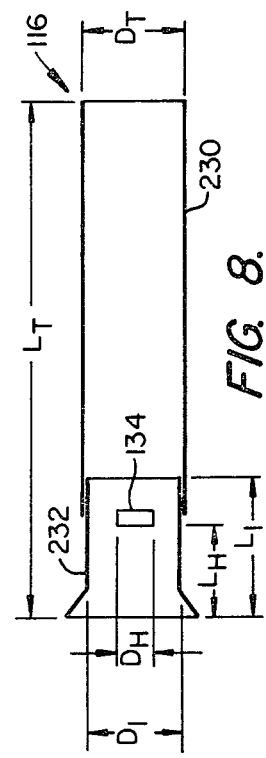
FIG. 8 is a schematic view of a portion of the experimental system of FIG. 7 which illustrates the relative dimensions of the components.
Figure 9:
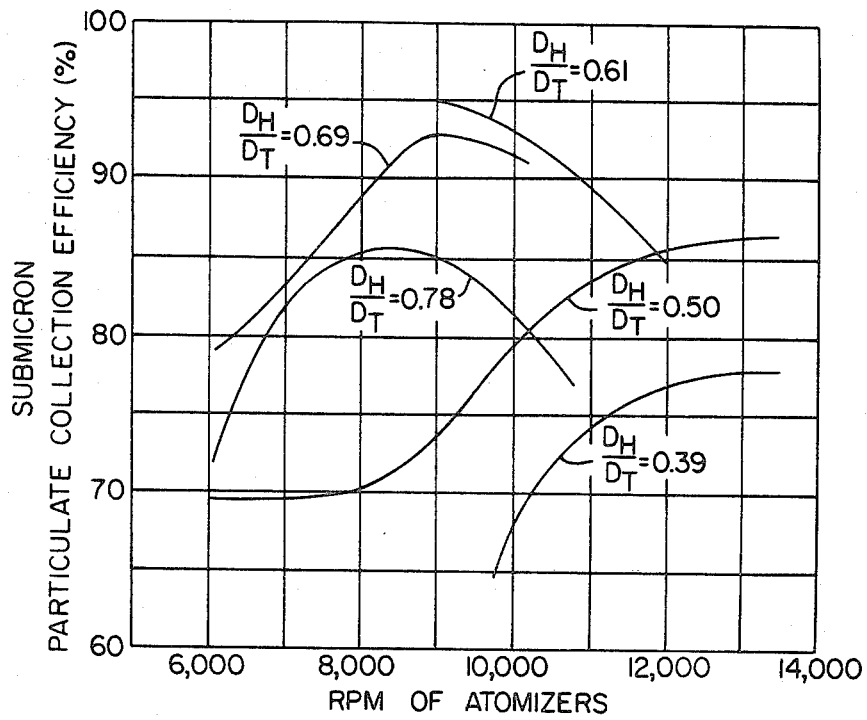
FIG. 9 is a graph of particulate collection efficiency as a function of hub RPM for several/tube diameter ratios.
Figure 10:
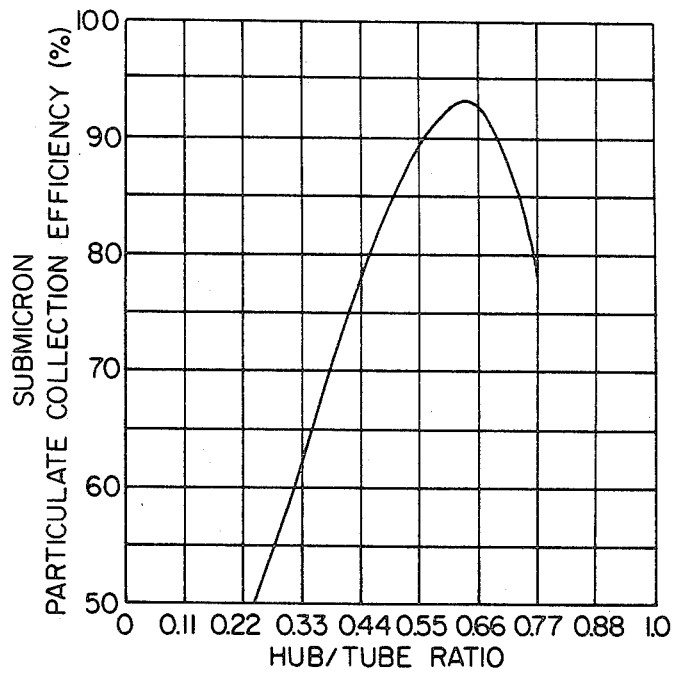
FIG. 10 is a graph of particulate collection efficiency as a function of hub/tube diameter ratio.

Referring to FIG. 8, the scrubbing unit 116 comprised a cylindrical duct 130 which circumscribed a flared inlet tube 132. The inside diameter ($D_I$) of the inlet tube 132 was 18.5 inches, and the inside diameter ($D_T$) of the duct 130 was 25 inches. A replaceable spray hub 134 was mounted on a drive shaft driven by a 25 HP electric motor 136 (FIG. 7) through a sheave and belt arrangement. The hub speed could be adjusted in the range from 6000 to 13,500 RPM by selecting the ratio of sheave diameters, although all tests were run at 10,800 RPM. The hub employed was constructed as described in reference to FIG. 5 hereinabove, having a diameter of 11 inches. Thus, the hub/tube diameter ratio was 0.61 for all tests.

The collection efficiency was determined by measuring the inlet and outlet particulate concentrations at sample ports 126 and 128, respectively. The sampling rates were adjusted to provide isokinetic sampling. Flowrates were calculated from velocity measurements taken with an S-type pitot tube and a hot-wire anemometer air velocity meter, model 440, manufactured by Kurz. The pitot tube assembly, manufactured by Anderson, contained a sampling probe, an S-type pitot tube to measure the gas stream velocity pressure, and a thermocouple temperature sensor to measure the gas stream temperature. The pitot tube assembly was followed directly by an inline filter holder, manufactured by Sierra. The sampling line contained a vacuum gauge to measure the probe vacuum pressure, plus a water trap, and a dry gas meter to measure the total volumetric air flow sampled, followed by a rotameter to monitor the gas flow during sampling and culminating with a vacuum pump. A Wager Model P-6 optical transmissometer was used to measure opacity. The opacity sensor was mounted four feet from the top of the second exhaust stack 124b.

The particulate collection measurements were made as follows. Two 102 mm glass fiber filters were weighed to the nearest 0.1 mg and placed in clean labeled glass petri dishes. The filters were kept in the petri dishes except during testing and weighing. During each test, filters were placed in the filter holders of both the inlet and outlet sampling trains, and the filter holders were sealed to prevent leakage. After the test run was completed, the filters were removed from the filter holders and placed in their respective petri dishes. They were then dried in an oven heated to 100° C. for one hour. After drying, they were removed and allowed to equilibrate to the lab temperature and humidity. The filters were then reweighed and the final weights were recorded.

It should be noted that the use of spray 114 was to presaturate and humidify the incoming air. Likewise, spray 122 was to keep the mist eliminator clean so that particles would not flake off and cause erroneous measurements of outlet particulate concentrations.

Results

Tests were run on stannic chloride, titanium tetrachloride, and silicon tetrachloride. The results are set forth in Table 1.

TABLE 1

| Test No. | Metal Halide | Metal Halide Feed (ml/min.) | Gas SCFM | Liquid* Flow (gpm) | Liquid/Gas Ratio | Hub/Duct Diameter |
| --- | --- | --- | --- | --- | --- | --- |
| 1 | SnCl$_4$ | 9 | 1500 | 15 | 10 | 0.61 |
| 2 | SnCl$_4$ | 14.3 | 2500 | 15 | 6 | 0.61 |
| 3 | SiCl$_4$ | 5.62 | 2000 | 15 | 7.5 | 0.61 |
| 4 | TiCl$_4$ | 24.9 | 1900 | 15 | 7.5 | 0.61 |
| 5 | TiCl$_4$ | — | 1500 | 15 | 10 | 0.61 |
| 6 | TiCl$_4$ | 30.5 | 1557 | 15 | 10 | 0.61 |
| 7 | TiCl$_4$ | 75.5 | 2481 | 15 | 6.0 | 0.61 |
| 8 | TiCl$_4$ | 21.3 | 3408 | 15 | 4.4 | 0.61 |

| | Metal Halide Removal | | | HCl Removal | | | |
| --- | --- | --- | --- | --- | --- | --- | --- |
| Test No. | Inlet gr/SCF | Outlet gr/SCF | Percentage | Inlet (ppm) | Outlet (ppm) | Percentage | Opacity (%) In/out |
| 1 | 0.27 | 0.00054 | 99.8 | 33 | <0.15 | 99.6 | 46.5/2 |
| 2 | 0.27 | 0.00081 | 99.7 | 27.5 | 0.22 | 99.6 | 22.7/0.5 |
| 3 | 0.043 | 0.0024 | 94.3 | 53 | 3.0 | 94.3 | —/10 |
| 4 | 0.20 | — | — | — | — | — | 33/0.5 |
| 5 | 0.15 | — | — | — | — | — | 40/1.5 |
| 6 | 0.207 | 0.0039 | 98.1 | — | — | >99.0 | 40/1 |
| 7 | 0.25 | 0.0037 | 98.5 | 165 | 3 | 98.2 | —/— |
| 8 | 0.079 | 0.0019 | 97.6 | 85 | 5 | 94 | 30/2.5 |

*With the exception of Test Nos. 1 and 2, all tests employed NaOH, pH 12, as the prespray and scrubbing liquid. Test Nos. 1 and 2 employed NaOH, pH 11.2.

The above results show that under the proper operating conditions, particulate collection efficiencies well in excess of 90%, and often in excess of 99%, may be achieved using the method of the present invention. In addition to metal halide removal, the present invention is capable of removing of HCl gas generated in the glass treatment operations, and is capable of reducing the opacity of the effluent gases to minute levels, usually to 2.5% or below.

Although the foregoing invention has been described in some detail by way of illustration and example for purposes of clarity of understanding, it will be appreciated that modifications and changes may be practiced within the scope of the appended claims.

What is claimed is:

1. A method for removing metal halide hydrolysis products from an air stream, said method employing a rotary spray scrubber including:
   a substantially cylindrical duct which defines an axial flow path for the air stream;
   a rotatable dispersion hub coaxially mounted in the duct, said hub including a circular periphery having a plurality of radial passages;
   wherein the cylindrical duct and the hub together define an annular passage therebetween in the axial direction, and wherein the ratio of the hub diameter to the duct diameter at said annular passage is in the range from about 0.55 to 0.75;
   said method comprising:
   rotating the hub at a preselected rotational speed;
   supplying liquid scrubbing medium to the passages in the hub so that a radial spray is directed to the annular passage between the hub and the duct; and
   directing the air stream flow through the annular passage whereby the radial spray impacts the particulates to remove them from the air stream.

2. An improved method as in claim 1, wherein the liquid scrubbing medium is a basic solution.

3. An improved method as in claim 2, wherein the basic solution is NaOH at a pH above about 10.

4. An improved method as in claim 1, wherein the air stream is sprayed with an aqueous prespray prior to entering the axial passage, whereby any metal halide vapor will be cooled and hydrated to form particulates.

5. A method as in claim 1, wherein the rotational speed of the hub is selected to provide a tangential velocity of at least about 500 ft/sec at the hub periphery.

6. A method as in claim 1, wherein the liquid scrubbing medium is supplied to the hub at a pressure below about 25 psi.

7. A method as in claim 1, wherein the liquid scrubbing medium to gas flowrate ratio is in the range from 5 to 10 gpm/MCFM.

* * * * *